No. 831,065. PATENTED SEPT. 18, 1906.
W. D. HAWK.
POWER TRANSMISSION APPARATUS.
APPLICATION FILED OCT. 30, 1905.

3 SHEETS—SHEET 1.

WITNESSES:

INVENTOR

BY

ATTORNEY

No. 831,065. PATENTED SEPT. 18, 1906.
W. D. HAWK.
POWER TRANSMISSION APPARATUS.
APPLICATION FILED OCT. 30, 1905.
3 SHEETS—SHEET 3.
Fig. 3,
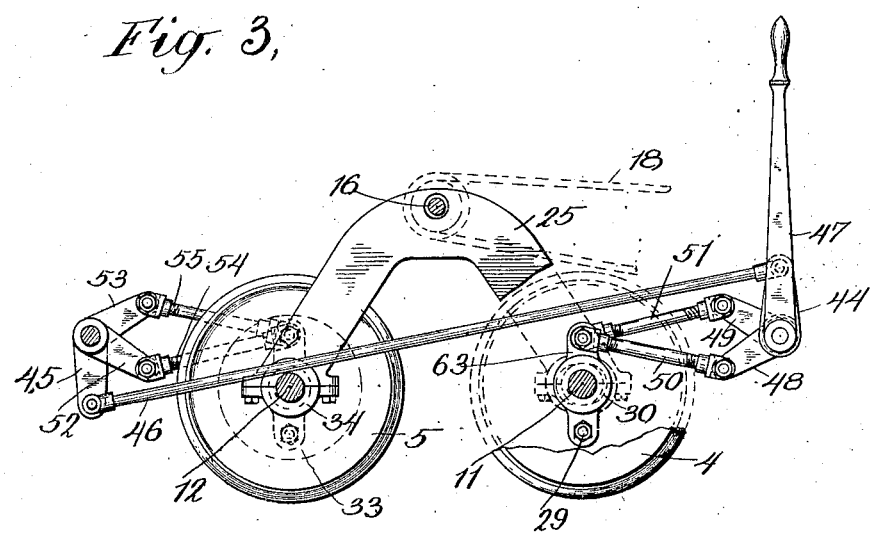
Fig. 4,
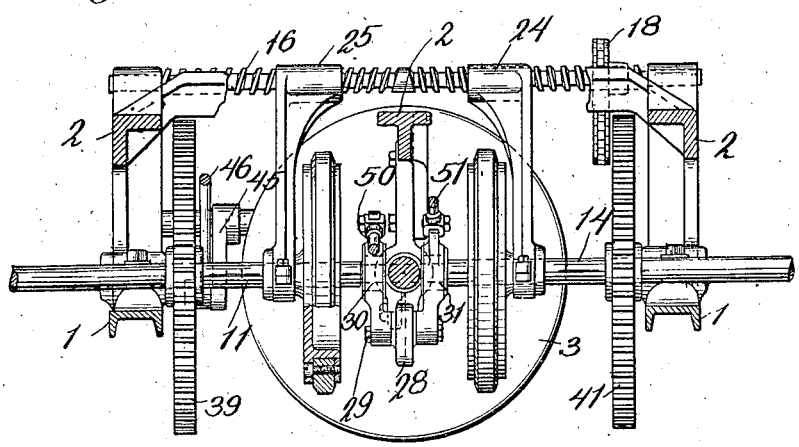
WITNESSES:
INVENTOR
Walter D. Hawk
BY
ATTORNEY

UNITED STATES PATENT OFFICE.

WALTER D. HAWK, OF CHICAGO, ILLINOIS.

POWER-TRANSMISSION APPARATUS.

No. 831,065.  Specification of Letters Patent.  Patented Sept. 18, 1906.

Application filed October 30, 1905. Serial No. 285,075.

*To all whom it may concern:*

Be it known that I, WALTER D. HAWK, a citizen of the United States, and a resident of Chicago, in the county of Cook and State of Illinois, have invented certain new and useful Improvements in Power-Transmission Apparatus, of which the following is a specification.

This invention relates to apparatus for transmitting power, and more particularly to a reversible variable-speed power-transmission device employing frictional gearing.

The object of the invention is to provide a frictional power-transmission device which is simple and durable in construction and effective in operation by which the direction of rotation of the driven member may be quickly and readily reversed and the speed of rotation in either direction adjusted as desired between wide limits and which is capable of transmitting a large amount of power.

A power-transmission apparatus built in accordance with my invention is particularly applicable for use on self-propelled vehicles, not only on the smaller automobiles carrying from two to six passengers, but also on the larger light passenger railway-cars and heavy trucks. The apparatus is also adapted for use in other relations—as, for instance, in connection with machine-tools—and therefore I do not wish to be understood as limited to any particular use.

The novel feature which I believe to be characteristic of my invention will be definitely indicated in the claims appended hereto.

The details of the construction and the method of operation of my improved power-transmission apparatus will be understood from the following description, taken in connection with the accompanying drawings, which show the preferred embodiment of my invention, and in which—

Figure 1:
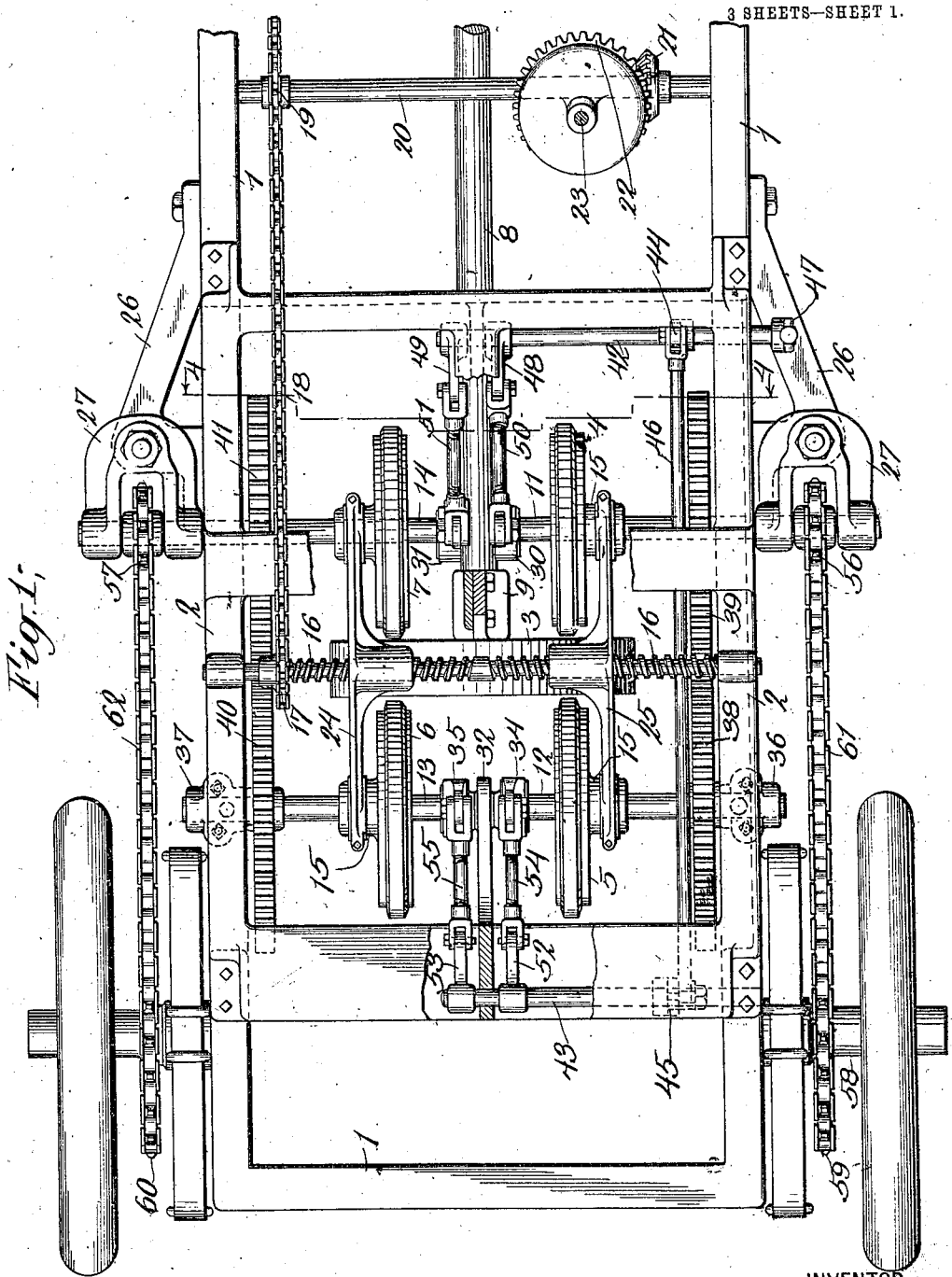
Figure 2:
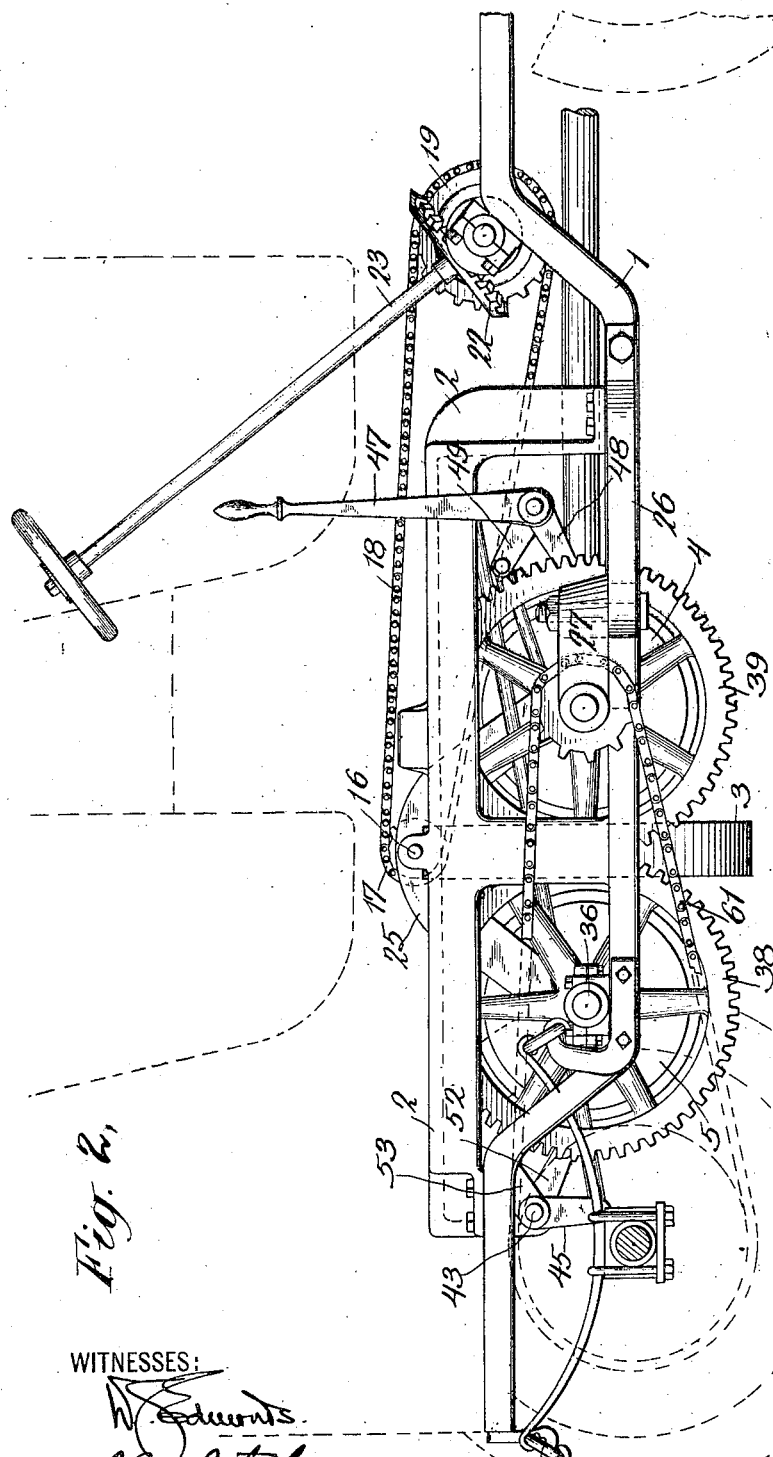

Figure 1 is a top view; Fig. 2, an elevation of the transmission apparatus. Fig. 3 is a view of the mechanism for operating the friction-rollers, and Fig. 4 is a section on line 4 4 of Fig. 1.

In the drawings I have shown my improved transmission as applied to an automobile; but it will be understood that this is merely for purposes of illustration.

The frame of the machine is indicated at 1, and an auxiliary frame 2 is secured thereon. The parts of the transmission mechanism are carried by this framework.

8 indicates the driving-shaft, in this case the shaft driven by the engine of the automobile, and may run continuously at constant speed. Depending from the under side of the frame 2 is a bearing 9 for the shaft. Secured on shaft 8 is a friction-disk 3. Two sets of friction-rollers 4 and 5 and 6 and 7 are adapted to engage the disk 3, one set on one side of the axis of the disk to give rotation of the driven shaft in one direction and the other set on the opposite side of the disk-axis to give rotation of the driven shaft in the opposite direction. The two rollers of each set are arranged to engage the disk on opposite sides thereof, so that when the rollers are in the operative position they squeeze the disk 3 between them, and there is therefore no twisting effect upon the disk due to the pressure of the rollers. The rollers 4, 5, 6, and 7 are splined, Fig. 3, on pivoted shafts 11, 12, 13, and 14, respectively. The hub 15 of each roller is provided with a peripheral groove. Mounted in bearings on the frame 2 is a rod 16, having reverse threads of heavy pitch cut therein, as shown in Figs. 1 and 4. This rod carries a gear 17, connected by a chain 18 with a gear 19, mounted on a shaft 20, supported in suitable bearings and carrying a bevel-gear 21. This gear meshes with a gear 22, mounted on a shaft 23, which extends upward and carries a suitable handle, so that turning this handle causes rotation of the shaft 16 in its bearings. Threaded on the rod 16 are two yokes 24 and 25, each of which has in its ends oval-shaped openings, as shown in Fig. 3, the sides of which extend into the peripheral grooves in the hubs 15 of the rollers of a set, the purpose of the oval shape of the openings being to permit lateral movement of the shafts carrying the friction-rollers. As the friction-rollers are splined on the shafts by which they are supported, it will be seen that turning the threaded rod 16 moves both sets of rollers radially with respect to disk 3.

The shafts 11, 12, 13, and 14, carrying the friction-rollers 4, 5, 6, and 7, respectively, are pivoted, and means are provided for turning them about their pivots to move the rollers carried thereby into and out of frictional engagement with the disk 3.

Secured to each side of the frame 1 is a support 26, to which is pivoted on a vertical axis a clevis 27, in the arms of which are formed bearings. Depending from the frame and extending down below the bearing 9 is an arm 28, carrying a bolt 29, on which are pivoted two bearing-boxes 30 and 31.

The shaft 11 is supported at one end in the bearing 30 and at the other in the bearings in the arms of the clevis 27, and shaft 14 is similarly supported at one end in the bearing 31 and at the other in the bearings in the arms of the clevis 27 on the other side of the frame. Depending from the frame, near the back thereof, is an arm 32, carrying at its end a bolt 33, on which are pivotally supported two bearing-boxes 34 and 35, similar to the bearings 30 and 31. Bearings 36 and 37 are pivoted on vertical axes in openings in the frame 1. Shaft 12 is supported in the bearings 34 and 36, and shaft 13 is similarly supported in the bearings 35 and 37. Mounted on shafts 11 and 12 are a pair of intermeshing gears 38 and 39 and on shafts 13 and 14 similar gears 40 and 41. To effect the lateral movement of the shafts carrying the friction-rollers, I provide two shafts 42 and 43, mounted in suitable bearings and carrying cranks 44 and 45, respectively, which are connected by a rod 46. Secured to shaft 42 is a lever 47, which extends upward to a position convenient for the operator. Also secured to shaft 44 are two cranks 48 and 49, one extending above and the other below the horizontal when lever 47 is in the middle position, as shown in the drawings. A link 50 is pivotally connected at one end to the free end of crank 48 and at the other to a lug 63 on the top of the bearing 30. A link 51 similarly connects crank 49 and a lug on the top of the bearing 31. Secured on shaft 43 are cranks 52 and 53, which are connected by links 54 and 55 to the bearings 34 and 35, respectively, in a similar manner. The driven shaft may be arranged to be driven by the friction-rollers in any suitable manner. In the drawings I have shown sprocket-gears 56 and 57 on the shafts 11 and 14, respectively, between the arms of the clevises 27. The driven shaft 58—in this instance the rear axle of the automobile—has gears 59 and 60 thereon, and chains 61 and 62 connect gears 56 and 59 and gears 57 and 60, respectively.

The operation of the device will now be described. When the engine is driving the shaft 8 and the disk 3 thereon and it is desired to obtain forward rotation of the driven shaft 58, the lever 47 is moved forward from the intermediate position shown in the drawings. This turns shaft 42 and also shaft 43 by means of rod 46 in the directions to straighten out the toggles formed by the crank 48 and link 50 and by crank 52 and link 54. This moves the bearings 30 and 34 toward each other about their pivots 29 and 33, respectively, thus turning shaft 11 about the axis of the pivoted clevis 27 and shaft 12 about the axis of the pivoted bearing 36 until friction-rollers 4 and 5 engage disk 3 on opposite sides thereof. The pressure of the rollers on the disk depends on the amount of pressure applied to lever 47, and I find that by the use of the toggles for positioning the rollers great pressure of the rollers on the disk can be obtained without difficulty. Since the two rollers 4 and 5, forming the set by which forward rotation of the driven shaft is obtained, bear on opposite sides of the disk, the disk is squeezed between them, and there is no tendency to twist the disk and bend it out of shape. The gears 38 and 39 transmit the power of shaft 12 to shaft 11, and from that shaft the power is transmitted to the driven shaft 58 by the gears 56 and 59 and chain 61. Only a very slight movement of the rollers of a set is sufficient to move them into and out of frictional engagement with the disk 3, and the movement of shafts 11 and 12 to accomplish this has no material effect on the relation of gears 38 and 39. The parts are so arranged that when rollers 4 and 5 are in engagement with disk 3 the gears 56 and 59 lie in the same plane, so that free working of the parts is obtained. If it is desired to vary the speed at which shaft 58 is driven, shaft 23 is turned by means of its handle, thus rotating rod 16 in its bearings, and the rod when turned moves yokes 24 and 25 longitudinally of the rod. Each yoke when moved thus causes movement of the rollers of a set longitudinally on their respective shafts—that is, radially of disk 3. The rollers can be moved in this manner while held in contact with disk 3, and as they are moved toward or away from the disk-axis the speed of the driven shaft is of course decreased or increased. If it is desired to reverse the direction of rotation of shaft 58, lever 47 is moved in the opposite direction. This buckles the toggles for positioning the rollers 4 and 5, so that those rollers are moved out of frictional engagement with disk 3 and straighten out the toggles formed by crank 49 and link 51 and by crank 53 and link 55. These toggles, acting on the bearings 31 and 35, turn shafts 14 and 13 about their pivots to bring rollers 7 and 6 into engagement with disk 3. Gears 40 and 41 transmit the power of shaft 13 to shaft 14, and chain 62 transmits the power of the two shafts to the driven shaft 58. As rollers 6 and 7 are on the side of the disk-axis opposite from rollers 4 and 5, the rotation of shaft 58 will in this case be in the opposite direction. It will be evident that the speed of rotation of shaft 58 can be adjusted over the full range while running in this direction just as when running in the forward direction. By moving lever 47 to an intermediate position, in which all the toggles are somewhat buckled, all the rollers will be out of engagement with the disk 3 and shaft 58 will remain at rest.

From the foregoing description it will be seen that by means of this apparatus rotation of the driven shaft in either direction can be obtained, the speed of rotation can be adjusted between wide limits for either direction of rotation, a great degree of pressure of the friction-rollers on the disk can be readily obtained, the changes of speed can be quickly made while the machine is running, and changing the direction of rotation of the driven shaft is readily effected by the movement of a single lever.

The contacting frictional rollers may be made of any suitable material which will give a good frictional engagement between them. I find that good results are obtained by making the disk 3 or the faces thereof of paper and the rollers 4, 5, 6, and 7 or the rims thereof of metal. Disk 3 may be splined on the shaft 8, if desired, to permit a slight movement of the disk longitudinally on the shaft to give elasticity between the engine and the transmission mechanism. The adjacent faces of the rollers 4 and 7 and 5 and 6 are preferably concaved, so that the rims of the rollers may be moved closer to the center of disk 3. Obviously the power can be transmitted from the shafts 12 and 13 to the driven shaft instead of shafts 11 and 14, if desired, in substantially the same manner as that illustrated, and the transmission can be by gears instead of by a chain and sprockets.

What I claim is—

1. In a power-transmission apparatus, the combination of a shaft, a disk thereon, two sets of friction-rollers mounted to engage said disk on opposite sides of the disk-axis, the rollers of each set being mounted to engage the disk on opposite sides thereof, means for causing one set or the other set of rollers to engage said disk, and a second shaft connected to said rollers, substantially as set forth.

2. In a power-transmission apparatus, the combination of a driving-shaft, a disk mounted thereon, two sets of friction-rollers, the rollers of each set being mounted to engage said disk on opposite sides thereof, one set on the side of the disk-axis opposite from that of the other, means for moving either set of rollers to cause them to engage said disk, and a driven shaft connected to said rollers, substantially as set forth.

3. In a power-transmission apparatus, the combination of a driving-shaft, a disk thereon, two sets of friction-rollers adapted to engage said disk on opposite sides of the disk-axis, the rollers of each set being mounted to engage the disk on opposite sides thereof, a driven shaft, gearing connecting each of said friction-rollers with the driven shaft, and means for moving the two sets of friction-rollers simultaneously toward or simultaneously away from the axis of said disk, substantially as set forth.

4. In a power-transmission apparatus, the combination of a driving-shaft, a disk thereon, two sets of friction-rollers adapted to engage said disk on opposite sides of the disk-axis, the rollers of each set being mounted to engage the disk on opposite sides thereof, means for moving said friction-rollers into and out of engagement with the disk, a driven shaft, gearing connecting each of said friction-rollers with the driven shaft, and means for moving the two sets of friction-rollers simultaneously toward or simultaneously away from the axis of said disk, substantially as set forth.

5. In a power-transmission apparatus, the combination of a driving-shaft, a disk secured thereon, two sets of friction-rollers, the rollers of each set being adapted to engage said disk on opposite sides thereof, one set on the side of the disk-axis opposite from that of the other, two pivoted shafts each carrying a roller of a set, supporting devices for the other roller of each set, means for turning either of said shafts on its pivot to cause the roller mounted thereon to engage said disk, and a driven shaft connected to said friction-rollers, substantially as set forth.

6. In a power-transmission apparatus, the combination of a driving-shaft, a disk secured thereon, two sets of friction-rollers, the rollers of each set being adapted to engage said disk on opposite sides thereof, one set on the side of the disk-axis opposite from that of the other, pivoted shafts upon each of which one of said rollers is mounted, means for turning on their pivots the shafts carrying the rollers of a set to cause the rollers thereon to engage said disk, and a driven shaft connected to said rollers, substantially as set forth.

7. In a power-transmission apparatus, the combination of a driving-shaft, a disk thereon, two sets of friction-rollers, the rollers of each set being mounted to engage said disk on opposite sides thereof, one set on the side of the disk-axis opposite from that of the other, a plurality of shafts on each of which one of said rollers is mounted, gearing between the shafts carrying the rollers of a set, means for causing one set or the other set of rollers to engage said disk, and a driven shaft connected to the friction-rollers, substantially as set forth.

8. In a power-transmission apparatus, the combination of a driving-shaft, a disk thereon, two sets of friction-rollers, the rollers of each set being mounted to engage said disk on opposite sides thereof, one set on the side of the disk-axis opposite from that of the other, pivoted shafts upon which rollers of different sets are mounted, gearing between each of said shafts and the roller of the same set as the one mounted on the shaft, means for turning either of said shafts on its pivot to cause the roller thereon to engage said disk, and a driven shaft connected to said pivoted shafts, substantially as set forth.

9. In a power-transmission apparatus, the combination of a driving-shaft, a disk thereon, two sets of friction-rollers, the rollers of each set being mounted to engage said disk on opposite sides thereof, one set on the side of the disk-axis opposite from that of the other, pivoted shafts on each of which one of said rollers is mounted, gearing between the shafts carrying the rollers of each set, means for turning on their pivots the shafts carrying the rollers of a set to cause the rollers thereon to engage said disk, and a driven shaft connected to said pivoted shafts, substantially as set forth.

10. In a power-transmission apparatus, the combination of a shaft, a disk thereon, two sets of friction-rollers mounted to engage said disk on opposite sides of the disk-axis, the rollers of each set being mounted to engage the disk on opposite sides thereof, means for moving a set of rollers radially with respect to the disk, means for causing one set or the other set of rollers to engage said disk, and a second shaft connected to said friction-rollers, substantially as set forth.

11. In a power-transmission apparatus, the combination of a driving-shaft, a disk mounted thereon, two sets of friction-rollers the rollers of each set being mounted to engage said disk on opposite sides thereof, one set on the side of the disk-axis opposite from that of the other, means for moving either set of rollers radially with respect to the disk, means for moving either set of rollers to cause them to engage the disk, and a driven shaft connected to said friction-rollers, substantially as set forth.

12. In a power-transmission apparatus, the combination of a driving-shaft, a disk thereon, two sets of friction-rollers, the rollers of each set being adapted to engage said disk on opposite sides thereof, one set on the side of the disk-axis opposite from that of the other, pivoted shafts upon which rollers of different sets are mounted, gearing connecting the rollers of each set, means for moving either set of rollers radially with respect to the disk, means for turning said shafts on their pivots to cause either set of rollers to engage the disk, and a driven shaft connected to said friction-rollers; substantially as set forth.

13. In a power-transmission apparatus, the combination of a shaft, a disk thereon, two sets of friction-rollers mounted to engage said disk on opposite sides of the disk-axis, the rollers of each set being mounted to engage the disk on opposite sides thereof, a single means for causing one set or the other set of rollers to engage said disk, and a second shaft connected to said friction-rollers, substantially as set forth.

14. In a power-transmission apparatus, the combination of a shaft, a disk mounted thereon, two sets of friction-rollers, the rollers of each set being mounted to engage said disk on opposite sides thereof, one set on the side of the disk-axis opposite from that of the other, a lever, means operated thereby when moved in one direction for causing one set of rollers to engage the disk, means operated by the lever when moved in the opposite direction for causing the other set of rollers to engage the disk, and a second shaft connected to said rollers, substantially as set forth.

15. In a power-transmission apparatus, the combination of a driving-shaft, a disk thereon, two sets of friction-rollers, the rollers of each set being adapted to engage said disk on opposite sides thereof, one set on the side of the disk-axis opposite from that of the other, pivoted shafts each carrying a roller of a set, a lever, means operated thereby when moved in opposite directions for turning one or the other of said shafts on its pivot to cause a set of rollers to engage the disk, and a driven shaft connected to said friction-rollers, substantially as set forth.

16. In a power-transmission apparatus, the combination of a driving-shaft, a disk mounted thereon, two sets of friction-rollers, the rollers of each set being adapted to engage said disk on opposite sides thereof, one set on the side of the disk-axis opposite from that of the other, pivoted shafts upon each of which one of said rollers is mounted, gearing connecting the rollers of each set, means for moving either set of rollers radially with respect to the disk, a lever, means operated thereby when moved in opposite directions for turning said shafts on their pivots to cause one or the other of said sets of rollers to engage the disk, and a driven shaft connected to said friction-rollers, substantially as set forth.

17. In a power-transmission apparatus, the combination of a driving-shaft, a disk thereon, two sets of friction-rollers, the rollers of each set being adapted to engage said disk on opposite sides thereof, one set on the side of the disk-axis opposite from that of the other, pivoted shafts upon each of which one of said rollers is mounted, gearing connecting the rollers of each set, means for moving either set of rollers radially of the disk, a lever, two shafts actuated thereby, links connecting each of said shafts with two of said pivoted shafts carrying rollers of different sets, and a driven shaft connected to said friction-rollers, substantially as set forth.

18. In a power-transmission apparatus, the combination of a shaft, a disk thereon, two sets of friction-rollers mounted to engage said disk on opposite sides of the disk-axis, the rollers of each set being mounted to engage the disk on opposite sides thereof, a member connected to the rollers of a set and having a threaded opening therein, a threaded rod extending through said opening, means for turning said rod, means for causing one set or the other set of rollers to engage said disk, and a second shaft connected to said rollers, substantially as set forth.

19. In a power-transmission apparatus, the combination of a driving-shaft, a disk thereon, two friction-rollers adapted to engage said disk on opposite sides of the disk-axis, two members each connected to one of said rollers and each provided with a threaded opening, a threaded rod extending through said openings, means for turning said rod, means for moving either of said rollers to cause it to engage said disk, and a driven shaft arranged to be driven by said friction-rollers, substantially as set forth.

20. In a power-transmission apparatus, the combination of a driving-shaft, a disk thereon, a friction-roller adapted to engage said disk, a shaft on which the roller is mounted, a pivoted clevis having bearings for said shaft formed in the arms thereof, means for moving said shaft about the pivot of the clevis to cause the friction-roller to engage and disengage said disk, a gear mounted on said shaft between the arms of the clevis, and a driven shaft actuated by said gear, substantially as set forth.

21. In a power-transmission apparatus, the combination of a driving-shaft, a disk thereon, two friction-rollers adapted to engage said disk on opposite sides of the disk-axis, two pivoted shafts on each of which one of said rollers is mounted, a shaft, two cranks thereon, links connecting the cranks with said pivoted shafts, means for turning the shaft carrying said cranks, and a driven shaft connected to said friction-rollers, substantially as set forth.

22. In a power-transmission apparatus, the combination of a driving-shaft, a disk thereon, two sets of friction-rollers adapted to engage said disk on opposite sides of the disk-axis, the rollers of each set being mounted to engage the disk on opposite sides thereof, pivoted shafts carrying rollers of different sets, means for turning said shafts on their pivots to cause the friction-rollers to engage said disk, a driven shaft, gearing connecting each of said friction-rollers with the driven shaft, and means for moving said rollers radially with respect to the disk, substantially as set forth.

23. In a power-transmission apparatus, the combination of a driving-shaft, a disk thereon, two sets of friction-rollers adapted to engage said disk on opposite sides of the disk-axis, the rollers of each set being mounted to engage the disk on opposite sides thereof, pivoted shafts on each of which one of said rollers is splined, means for turning said shafts on their pivots to cause the friction-rollers to engage and disengage said disk, a driven shaft, gearing connecting each of said friction-rollers with the driven shaft, and means for moving said rollers radially with respect to the disk, substantially as set forth.

This specification signed and witnessed this 23d day of October, 1905.

WALTER D. HAWK.

Witnesses:
RILEY M. LITTLE,
WALTER IRVIN.